United States Patent
Remen et al.

(10) Patent No.: US 10,944,675 B1
(45) Date of Patent: Mar. 9, 2021

(54) TCAM WITH MULTI REGION LOOKUPS AND A SINGLE LOGICAL LOOKUP

(71) Applicant: Mellanox Technologies TLV Ltd., Raanana (IL)

(72) Inventors: Tom Remen, Ramat Gan (IL); Nir Monovich, Hod Hasharon (IL); Gil Levy, Hod Hasharon (IL); Aviv Kfir, Nili (IL); Linor Nehab, Haifa (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 16/559,658

(22) Filed: Sep. 4, 2019

(51) Int. Cl.
*H04L 12/743* (2013.01)
*H04L 29/06* (2006.01)
*H04L 12/741* (2013.01)

(52) U.S. Cl.
CPC .......... *H04L 45/7457* (2013.01); *H04L 45/54* (2013.01); *H04L 69/22* (2013.01)

(58) Field of Classification Search
CPC ...... H04L 45/7457; H04L 45/54; H04L 69/22
See application file for complete search history.

(56) References Cited

U.S. PATENT DOCUMENTS

| | | | |
|---|---|---|---|
| 6,611,875 B1 | 8/2003 | Chopra et al. | |
| 6,957,215 B2 | 10/2005 | Stark | |
| 7,051,078 B1 | 5/2006 | Cheriton | |
| 7,054,315 B2 | 5/2006 | Liao | |
| 7,061,874 B2 | 6/2006 | Merugu et al. | |
| 7,116,663 B2 | 10/2006 | Liao | |
| 7,234,019 B1 | 6/2007 | Kao et al. | |
| 7,394,809 B2 | 7/2008 | Kumar et al. | |
| 7,804,699 B2 | 9/2010 | Gupta et al. | |
| 7,933,282 B1 | 4/2011 | Gupta et al. | |
| 8,271,564 B2 | 9/2012 | Dade et al. | |
| 8,290,934 B2 | 10/2012 | Stergiou et al. | |

(Continued)

OTHER PUBLICATIONS

Lakshminarayanan et al., "Algorithms for advanced packet classification with ternary CAMs", Proceedings of the 2005 conference on Applications, technologies, architectures, and protocols for computer communications (SIGCOMM 05), pp. 193-204, Aug. 21-26, 2005.

(Continued)

*Primary Examiner* — Philip C Lee
(74) *Attorney, Agent, or Firm* — Kligler & Associates Patent Attorneys Ltd

(57) ABSTRACT

A network element includes ports, a hardware fabric, a packet classifier and control logic. The ports are configured to transmit and receive packets over a network. The fabric is configured to forward the packets between the ports. The packet classifier is configured to receive at least some of the packets and to specify an action to be applied to a packet in accordance with a set of rules. The classifier includes (i) multiple Ternary Content Addressable Memories (TCAMs), each TCAM configured to match the packet to a respective subset of the set of rules and to output a match result, and (ii) circuitry configured to specify the action to be applied to the packet based on match results produced for the packet by the multiple TCAMs, and based on a priority defined among the multiple TCAMs. The control logic is configured to apply the specified action to the packet.

16 Claims, 7 Drawing Sheets

(56) References Cited

U.S. PATENT DOCUMENTS

| | | | |
|---|---|---|---|
| 8,305,271 | B2 | 11/2012 | Li et al. |
| 8,462,786 | B2 | 6/2013 | Liu et al. |
| 8,619,766 | B2 | 12/2013 | Wang et al. |
| 8,856,203 | B1 | 10/2014 | Schelp et al. |
| 8,938,469 | B1 | 1/2015 | Keen et al. |
| 9,098,601 | B2 | 8/2015 | Wang |
| 9,111,615 | B1* | 8/2015 | Jiang ............... G11C 15/04 |
| 9,171,030 | B1 | 10/2015 | Arad et al. |
| 9,223,711 | B2 | 12/2015 | Philip et al. |
| 9,262,312 | B1 | 2/2016 | Gazit et al. |
| 9,317,517 | B2 | 4/2016 | Attaluri et al. |
| 9,344,366 | B2 | 5/2016 | Bouchard et al. |
| 9,424,366 | B1 | 8/2016 | Gazit et al. |
| 9,438,505 | B1 | 9/2016 | Zhou et al. |
| 9,543,015 | B1* | 1/2017 | Roy ............... G11C 15/04 |
| 9,569,561 | B2 | 2/2017 | Wildman et al. |
| 9,627,063 | B2 | 4/2017 | Dharmapurikar |
| 9,659,046 | B2 | 5/2017 | Sen et al. |
| 9,704,574 | B1 | 7/2017 | Shamis |
| 9,779,123 | B2 | 10/2017 | Sen et al. |
| 9,785,666 | B2 | 10/2017 | Li et al. |
| 9,866,479 | B2 | 1/2018 | Wang et al. |
| 9,892,057 | B2 | 2/2018 | Levy et al. |
| 9,984,144 | B2 | 5/2018 | Levy et al. |
| 10,049,126 | B2 | 8/2018 | Levy et al. |
| 10,068,034 | B2 | 9/2018 | Levy et al. |
| 2002/0089937 | A1 | 7/2002 | Venkatachary et al. |
| 2003/0123459 | A1 | 7/2003 | Liao |
| 2004/0100950 | A1* | 5/2004 | Basu ............... H04L 45/745 |
| | | | 370/389 |
| 2006/0209725 | A1 | 9/2006 | Cadambi et al. |
| 2008/0192754 | A1 | 8/2008 | Ku et al. |
| 2008/0228691 | A1 | 9/2008 | Shavit et al. |
| 2008/0259667 | A1* | 10/2008 | Wickeraad ......... G11C 15/04 |
| | | | 365/49.1 |
| 2010/0080223 | A1 | 4/2010 | Wong et al. |
| 2010/0269024 | A1 | 10/2010 | Hao et al. |
| 2012/0054467 | A1 | 3/2012 | Fulton et al. |
| 2012/0275466 | A1 | 11/2012 | Bhadra et al. |
| 2013/0311492 | A1 | 11/2013 | Calvignac et al. |
| 2014/0006706 | A1 | 1/2014 | Wang |
| 2014/0089498 | A1 | 3/2014 | Goldfarb et al. |
| 2014/0201307 | A1 | 7/2014 | Banavalikar et al. |
| 2014/0215144 | A1 | 7/2014 | Valency et al. |
| 2014/0310307 | A1 | 10/2014 | Levy et al. |
| 2015/0058595 | A1 | 2/2015 | Gura et al. |
| 2015/0127900 | A1 | 5/2015 | Dharmapurikar et al. |
| 2015/0207735 | A1 | 7/2015 | Kuramoto |
| 2015/0242429 | A1 | 8/2015 | Varvello et al. |
| 2015/0244842 | A1 | 8/2015 | Laufer et al. |
| 2016/0202932 | A1* | 7/2016 | Kadu ............... G06F 12/0802 |
| | | | 711/108 |
| 2016/0294625 | A1 | 10/2016 | Mahkonen et al. |
| 2017/0046395 | A1 | 2/2017 | Li et al. |
| 2017/0053012 | A1 | 2/2017 | Levy et al. |
| 2017/0147254 | A1 | 5/2017 | Adams et al. |
| 2017/0195253 | A1 | 7/2017 | Annaluru et al. |
| 2017/0346765 | A1 | 11/2017 | Immidi |
| 2018/0278525 | A1 | 9/2018 | Levy et al. |
| 2019/0036821 | A1* | 1/2019 | Levy ............... H04L 69/22 |
| 2020/0089816 | A1 | 3/2020 | Shattah |

OTHER PUBLICATIONS

Pagh, R., "Cuckoo Hashing for Undergraduates", IT University of Copenhagen, 6 pages, Mar. 27, 2006.

Pagh et al., "Cuckoo Hashing", Journal of Algorithms, vol. 51, pp. 122-144, May 2004.

Kirsch et al., "Less Hashing, Same Performance: Building a Better Bloom Filter", Random Structures and Algorithms, vol. 33, issue 2, pp. 187-218, Sep. 2008.

Kirsch et al., "More Robust Hashing: Cuckoo Hashing with a Stash", SIAM Journal on Computing, vol. 39, Issue 4, pp. 1543-1561, Sep. 2009.

Patrow, A., "General Purpose Hash Function Algorithms", 6 pages, year 2000 http://www.partow.net/programming/hashfunctions/.

Laurence et al., "Spam Based Architecture for tcam for Low Area and Less Power Consumption", ARPN Journal of Engineering and Applied Sciences, vol. 10, No. 17, pp. 7607-7612, Sep. 2015.

Song et al., "Fast Hash Table Lookup Using Extended Bloom Filter: An Aid to Network Processing", Proceedings of SIGCOMM Conference, Philadelphia, USA, pp. 181-192, Aug. 21-26, 2005.

Waldvogel et al., "Scalable High-Speed Prefix Matching", ACM Transactions on Computer Systems (TOCS), vol. 19, Issue 4, pp. 440-482, Nov. 2001.

Vamanan et al., "EffiCuts: optimizing packet classification for memory and throughput", Proceedings of the SIGCOMM conference, New Delhi, India, pp. 207-218, Aug. 30-Sep. 3, 2010.

Singh et al., "Packet classification using multidimensional cutting", Proceedings of SIGCOMM Conference, Karlsrube, German, pp. 213-224, Aug. 25-29, 2003.

Taylor et al., "ClassBench: a packet classification benchmark", WUCSE-2004-28, Applied Research Laboratory Department of Computer Science and Engineering, Washington University, Saint Louis, USA, 37 pages, May 21, 2004.

Demetriades et al., "An Efficient Hardware-basedMulti-hash Scheme for High Speed IP Lookup", 16th IEEE Symposium on High Performance Interconnects, pp. 103-110, Aug. 26-28, 2008.

Meiners et al., "Algorithmic Approaches to Redesigning TCAM-Based Systems", Proceedings of the 2008 ACM SIGMETRICS international conference on Measurement and modeling of computer systems (SIGMETRICS '08), pp. 467-468, Jun. 2-6, 2008.

Kasnavi et al., "A cache-based internet protocol address lookup architecture", Computer Networks, vol. 52 , pp. 303-326, year 2008.

Matousek, et al., "ClassBench-ng: Recasting ClassBench After a Decade of Network Evolution", Proceedings of the Symposium on Architectures for Networking and Communications Systems (ANCS '17) ,13 pages, May 2017.

Levy et al., U.S. Appl. No. 16/052,646, filed Aug. 2, 2018.

Hua et al., "Variable-Stride Multi-Pattern Matching for Scalable Deep Packet Inspection", IEEE INFOCOM , pp. 415-423, Rio de Janeiro, Brazil, Apr. 19-25, 2009.

Che et al., "DRES: Dynamic Range Encoding Scheme for TCAM Coprocessors", IEEE Transactions on Computers, vol. 57, No. 7, pp. 902-915, Jul. 2008.

Liu et al., "TCAM Razor: A Systematic Approach Towards Minimizing Packet Classifiers in TCAMs", IEEE/ACM Transactions on Networking, vol. 18, No. 2, pp. 490-500, Apr. 2010.

Liu et al., "All-Match Based Complete Redundancy Removal for Packet Classifiers in TCAMs", Proceedings of IEEE 27th Conference on Computer Communications (INFOCOM 2008), pp. 574-582, Apr. 13-18, 2008.

Liu et al., "Complete Redundancy Removal for Packet Classifiers in TCAMs", IEEE Transactions on Parallel and Distributed Systems, vol. 21, No. 4, pp. 424-437, Apr. 2010.

Taylor et al., "Scalable Packet Classification using Distributed Crossproducting of Field Labels", IEEE INFOCOM, pp. 1-12, 2005.

Pontarelli et al., "Parallel d-Pipeline: A Cuckoo Hashing Implementation for Increased Throughput", IEEE Transactions on Computers, vol. 65, No. 1, pp. 326-331, Jan. 2016.

Reviriego et al., "Energy Efficient Exact Matching for Flow Identification with Cuckoo Affinity Hashing", IEEE Communications Letters, vol. 18, No. 5, pp. 885-888, May 2014.

Pontarelli et al., "Cuckoo Cache: A Technique to Improve Flow Monitoring Throughput", IEEE Internet Computing, vol. 20, issue 4, pp. 1-11, Jul.-Aug. 2016.

Zhou et al., "Scalable, High Performance Ethernet Forwarding with CUCKOOSWITCH", CoNEXT '13, pp. 1-12, Santa Barbara, USA, Dec. 9-12, 2013.

U.S. Appl. No. 16/132,549 Office Action dated Oct. 28, 2020.

Xu et al., "A Novel Hash-based Packet Classification Algorithm," 5th International Conference on Information Communications & Signal Processing, pp. 1504-1508, Dec. 2005.

* cited by examiner

B: Effect of Rule Insertion on the TCAMs and tables

TCAM WITH MULTI REGION LOOKUPS AND A SINGLE LOGICAL LOOKUP

FIELD OF THE INVENTION

The present invention relates generally to communication networks, and particularly to efficient use of TCAM to classify network packets.

BACKGROUND OF THE INVENTION

In communication networks, Ternary Content-Addressable Memories (TCAMs) are sometimes used to classify input packets and define packet actions, such as routing and security. Typically, TCAMs are either separate semiconductor devices, or embedded in a System-on-Silicon (SOC) with the main network processor. In both cases, TCAMs constitute a major hardware resource that consumes a considerable amount of power and area. Hence, the efficient use of the TCAM in packet classification is of paramount importance.

Techniques to increase the efficiency of TCAMs in packet classification are described, for example, in "Algorithms for Advanced Packet Classification with Ternary CAMs," Lakshminarayanan et al., ACM SIGCOMM 2005.

SUMMARY OF THE INVENTION

An embodiment that is described herein provides a network element including multiple ports, a hardware fabric, a packet classifier and control logic. The ports are configured to transmit and receive packets over a network. The hardware fabric is configured to forward the packets between the ports. The packet classifier is configured to receive at least some of the packets and to specify an action to be applied to a packet in accordance with a set of rules. The classifier includes (i) multiple Ternary Content Addressable Memories (TCAMs), each TCAM configured to match the packet to a respective subset of the set of rules and to output a match result, and (ii) circuitry configured to specify the action to be applied to the packet based on match results produced for the packet by the multiple TCAMs and based on a priority defined among the multiple TCAMs. The control logic is configured to apply the specified action to the packet.

In some embodiments, the circuitry is further configured to reconfigure two or more of the rules atomically, by selectively activating and deactivating one or more of the TCAMs. In an example embodiment, the circuitry is configured to deactivate a first TCAM while retaining a second TCAM active, to reconfigure the rules in the deactivated first TCAM, and then to activate the first TCAM.

In some embodiments, the circuitry is configured to define a subset of the TCAMs as high-priority TCAMs; if at least one of the high-priority TCAMs indicates a successful match for the packet, to specify the action based only on the match results of the high-priority TCAMs; and if none of the high-priority TCAMs indicates a successful match for the packet, to wait for the match results of one or more TCAMs other than the high-priority TCAMs for specifying the action. In a disclosed embodiment, the high-priority TCAMs have a faster response time than the TCAMs other than the high-priority TCAMs. In another embodiment, the high-priority TCAMs are on-chip TCAMs that are located in a same Integrated Circuit (IC) as the fabric, and the TCAMs other than the high-priority TCAMs are off-chip TCAMs that are not located in the same IC as the fabric.

In an embodiment, the circuitry is configured to assign each rule a respective activity indicator, which is indicative of how frequently, from among the rules stored in the plurality of TCAMs, the action was specified based on that rule.

There is additionally provided, in accordance with an embodiment of the present invention, a method including, in a network element that transmits and receives packets over a network, specifying an action to be applied to a packet in accordance with a set of rules, by: in each of multiple Ternary Content Addressable Memories (TCAMs), matching the packet to a respective subset of the set of rules and outputting a match result; and specifying the action to be applied to the packet based on (i) match results produced for the packet by the multiple TCAMs and (ii) a priority defined among the multiple TCAMs. The specified action is applied to the packet.

The present invention will be more fully understood from the following detailed description of the embodiments thereof, taken together with the drawings in which:

DETAILED DESCRIPTION OF EMBODIMENTS

Overview

Figure 1:
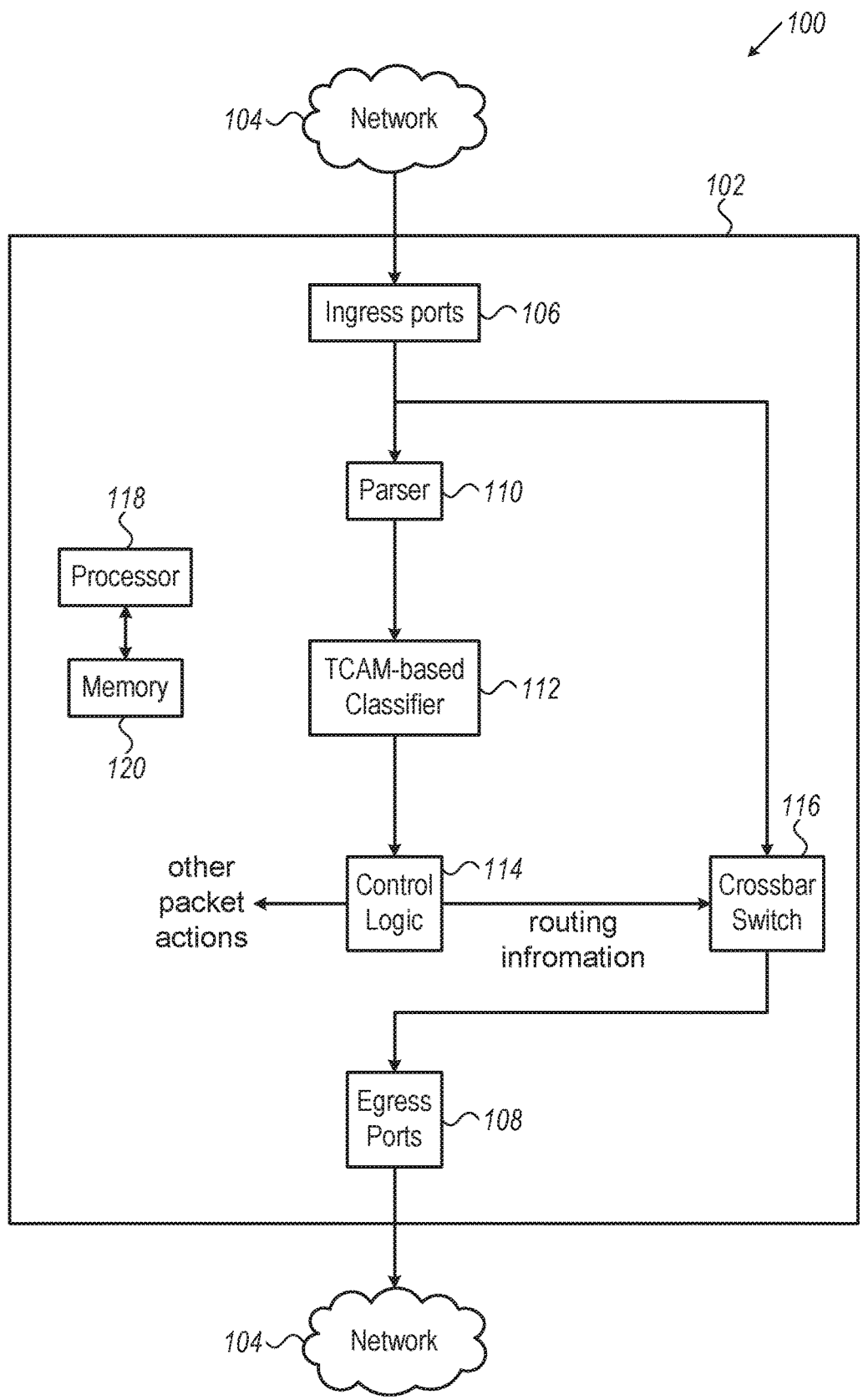
FIG. 1 is a block diagram that schematically illustrates a network element, in accordance with an embodiment of the present invention.

Network elements, such as network switches/routers, receive packets from ingress ports and forward the packets to egress ports, according to forwarding/routing rules. The network element typically comprises a Packet Classifier that is configured to apply forwarding/routing rules to packets based on packet headers.

In embodiments according to the present invention, Ternary Content Addressable Memories (TCAMs) perform high-speed packet classification by comparing a packet header and other packet-related inputs with a full suite of classification rules in ternary encoding. The comparison is done in parallel; e.g., in a single clock cycle.

The TCAM stores a plurality of search entries, wherein each entry comprises a plurality of ternary symbols. A ternary symbol may be at logic-1, logic-0 or "don't-care" (x). A plurality of Search-Lines (collectively referred to as a "search word") is input to the TCAM, which compares the search-word simultaneously to all TCAM entries. A Match line is typically associated with each stored entry, to indicate the comparison results. The TCAM sets each match line to a first binary value if all stored symbols match the logic values asserted on the corresponding search lines, and, otherwise, to a second binary value (a ternary symbol and a bit match when the ternary symbol is at "x", or when both the ternary symbol and the bit are at the same logic value).

A TCAM cell is typically larger than a Static Random-Access Memory (SRAM) cell, and much larger than a Dynamic Random-Access Memory (DRAM) cell. In terms of power consumption, since a TCAM compares the search-word concurrently to all stored entries, it consumes significantly more power than other types of memories.

The power consumption and the area of a TCAM are roughly proportional to the number of search lines multiplied by the number of match lines. The number of match lines (which equals the number of entries that are stored in the TCAM) is large when the number of defined packet actions is large. The number of search-lines increases when more bits that are associated with the packet are compared and may reach hundreds of bits for a typical TCP/IP packet header.

Embodiments of the present invention that are described herein provide improved methods and systems for TCAM-based packet classification. In some embodiments, the classification rules are split among a plurality of TCAMs, wherein each TCAM compares a subset of the compare lines. In a simplified example, packets are classified according to 300 rules—200 rules classify the packets according to a 16-bit field of the packet header, and 100 rules classify the packets according to a 24-bit field of the packet header (the two fields are mutually exclusive). In a single-TCAM implementation, the TCAM will have 16+24=40 compare lines and 300 match lines. In an example embodiment of the present invention, two TCAMs will be employed—a 24-search-lines-100-match-lines first TCAM and a 16-search-lines-200-match-lines second TCAM. The area and power in the single-TCAM implementation will be proportional to 300*(24+16)=12000, whereas in the two-TCAM embodiment, the area and power will be proportional to 200*16+100*24=5600. The apparent saving is slightly offset by an additional circuitry (to be described below), which determines the final packet action from the two actions indicated by the two TCAMs, and from the overhead associated with any TCAM instance, but, in embodiments, significant savings in power and areas remain.

Priority

When a TCAM compares a search word to the stored entries, more than one entry may match; however, typically, only one packet action should take place. In embodiments according to the present invention, TCAM entries are prioritized. In some embodiments, the priority is set according to the geometric locations of the entries in the TCAM. For example, entries that are closer to the top of the TCAM array may have higher priority.

In some embodiments, a priority encoder may be attached to each TCAM. The priority encoder is configured to receive all the match lines, and to identify and output the location of the matching entry having the highest priority. The priority encoder may generate, for example, a binary code representing the location of the entry.

In embodiments according to the present invention, where a plurality of TCAMs are employed, the network element comprises a Final Packet-Action Circuitry ("FPAC"). The FPAC is coupled to the priority encoders of all TCAMs, and is configured to output the final action to be applied to the packet. In some embodiments, the FPAC comprises a rule priority table, which stores a rule priority index for each match line of all TCAMs. The FPAC determines the final packet action according to the highest priority rule.

Validity Bit

According to embodiments of the present invention that are presented herein, each TCAM entry may comprise a Valid bit. When the valid bit is not set, that corresponding TCAM entry will never indicate a match. The valid bit may be implemented by dedicated TCAM hardware, or by dedicating one of the compare lines to verify that only valid entries (e.g., entries wherein the corresponding bit is set) may indicate a match.

TCAM Maintenance

During the operation of a network element, packet action rules may change from time to time. For example, the priority of a rule may be modified, a new rule may be added, and an existing rule may be removed or modified. According to embodiments of the present invention, when a rule with a given priority is added in one of the TCAMs, it may be required to move rules with lower priority down (in the example described above, this means further from the geometric top of the TCAM), to make room for the new rule. In embodiments wherein a plurality of TCAMs is used, it may also be necessary to modify the FPAC entries, as the rule priority table must also change for lower priority rules that are stored in other TCAMs.

When a rule is removed, its entry in the corresponding TCAM is marked as invalid (see above). No changes should be made in other TCAMs or in other entries of the same TCAM.

Modifications to rules are accomplished by the removal of the rule, followed by the insertion of the modified rule.

Atomic Rule-Set Insertion and Removal

According to some embodiments of the present invention, the FPAC circuitry may be dynamically controlled to allow or ignore match-line inputs, separately for each of the TCAMs. We will refer hereinbelow to allowing match-line inputs from a TCAM as TCAM Activation, and to ignoring match lines from a TCAM as TCAM Deactivation; a TCAM that the FPAC Activates will be referred to as an Active TCAM, and a TCAM that the FPAC Deactivates will be referred to as an Inactive TCAM. Generally, any suitable mechanism that causes the FPAC to consider/disregard the output of a given TCAM can be used, and is regarded herein as activating/deactivating the given TCAM, respectively.

In many practical cases it is important to reconfigure (e.g., add, remove or modify) a set of rules atomically. In the present context, the term "atomically" means that, at any point in time, the entire set of rules is either fully reconfigured or not reconfigured at all.

In an embodiment, the network element uses TCAM Activation and Deactivation to perform atomic reconfiguration, e.g., addition, removal and/or replacement, of sets of rules. The disclosed rule reconfiguration techniques also use the fact that it is permissible for the same rule to exist in different TCAMs simultaneously. The disclosed actions are performed atomically, but without disrupting the normal operation of the classifier.

For example, the network element may write a new set of rules in an inactive TCAM, and then, when all rules are written, activate the TCAM. All new rules will be activated at once. At a later stage, copies of the new rules may be written, one by one, to another active TCAM; after all new rules have been copied, the newly activated TCAM may be deactivated, and free to receive more rules (copies of the same rule may be stored in more than one location at the same time).

Similarly, to erase a set of rules, the network element first copies the set of rules to be erased from a first TCAM (in which they are stored) to an inactive second TCAM, activates the second TCAM, and then erases (e.g. invalidates) the rules from the first TCAM.

In an embodiment, at least three TCAMs are used, and a full set of rules may be replaced by a new set in an atomic manner, without the need to copy and then change entire regions.

Activity Indicators

According to some embodiments of the present invention, the network element comprises activity indicators that are associated with the TCAM entries. Activity indicators are useful for replacing entries in the TCAM that are rarely used with new and more promising entries. In its simplest form, an activity indicator is a single bit, which is set when a TCAM entry is the highest priority match and cleared when the software or firmware needs to check which rule was active.

In the embodiments described above, where multiple TCAMs are used, a highest priority match in a TCAM does not set a corresponding activity bit. Rather, activity bits are defined for each rule, and set by the FPAC when the rule is the highest priority match of all TCAMs (i.e., when the rule is ultimately chosen to set the final action).

Serial, Parallel and Pipelined TCAM Search

According to some embodiments of the present invention, when a packet is classified, all the TCAMs compare the packet header in parallel; thus, the time to get the final action will typically be set according to the delay of the slowest TCAM.

According to other embodiments, the TCAMs are accessed serially, and in the worst case the time to get the final action will be the sum of the delays of all TCAMs. However, if the TCAMs are arranged so that the higher priority rules will be compared first, the search may be terminated when a match is found (this technique is sometimes referred to as Pruning), and the average search time may be reduced. In some embodiments the low-priority rules are stored in a separate TCAM integrated circuit, whereas the higher priority rules (typically a smaller number) are stored in on-chip TCAMs. Since the TCAMs which are integrated in the same integrated circuit with the other circuits of the network element (e.g., the switch fabric) are typically faster, serial access may yield considerably better average search-time. (We will refer below to TCAMs external and internal to the main network element integrated circuit, which comprises the switch fabric, as off-chip and on-chip TCAMs, respectively.)

In yet other embodiments, a combination of serial and parallel searches may be used. For example, all on-chip TCAMs may be searched in parallel, and, if no match is found, the off-chip TCAM may then be searched.

In an embodiment, the network element searches the TCAMs serially, but in a pipelined manner. For example, if packet headers are serially searched for in a first and a second TCAM, when packet header n is searched in the second TCAM, a new packet header n+1 is searched in the first packet header.

Thus, according to embodiments of the present invention that are provided herein, packet headers may be searched for rules using a plurality of TCAMs, in an efficient manner. An additional advantage is fast atomic ruleset insertion, deletion and replacement.

SYSTEM DESCRIPTION

FIG. 1 is a block diagram 100 that schematically illustrates a network element 102, in accordance with embodiments of the present invention. The network element communicates with a network 104, and comprises Ingress Ports 106, which are configured to receive packets from the network; Egress ports 108, which are configure to send packets over the network; a Parser 110, which is configured to extract packet headers from the received packets; a TCAM-Based Classifier 112, which is configured to classify the packets responsive to the packet headers and to routing rules tables; a Control Logic 114, which is configured to control routing and other actions that the network element performs on the packets; and, a Crossbar Switch 116, which is configured to route incoming packets to the egress ports.

In the descriptions hereinbelow, we will refer to TCAM-based classifiers as TCAM-Classifier, and to multi-region-TCAM-based classifiers as M-TCAM-Classifiers.

Network Element 100 further comprises a processor 118 and a memory 120. The processor controls the operation of the network element; in some embodiments the processor may change the routing rules tables from time to time. Memory 120 stores the processor program and data.

In embodiments according to the present invention, the TCAM-classifier comprises a plurality of TCAMs, wherein each TCAM stores rules pertaining to subfields of the packet headers. As will be described below, the area and power consumption of an M-TCAM based classifier may be lower than the area and power consumption of a classifier that is based on a single-region single-TCAM.

Figure 2:
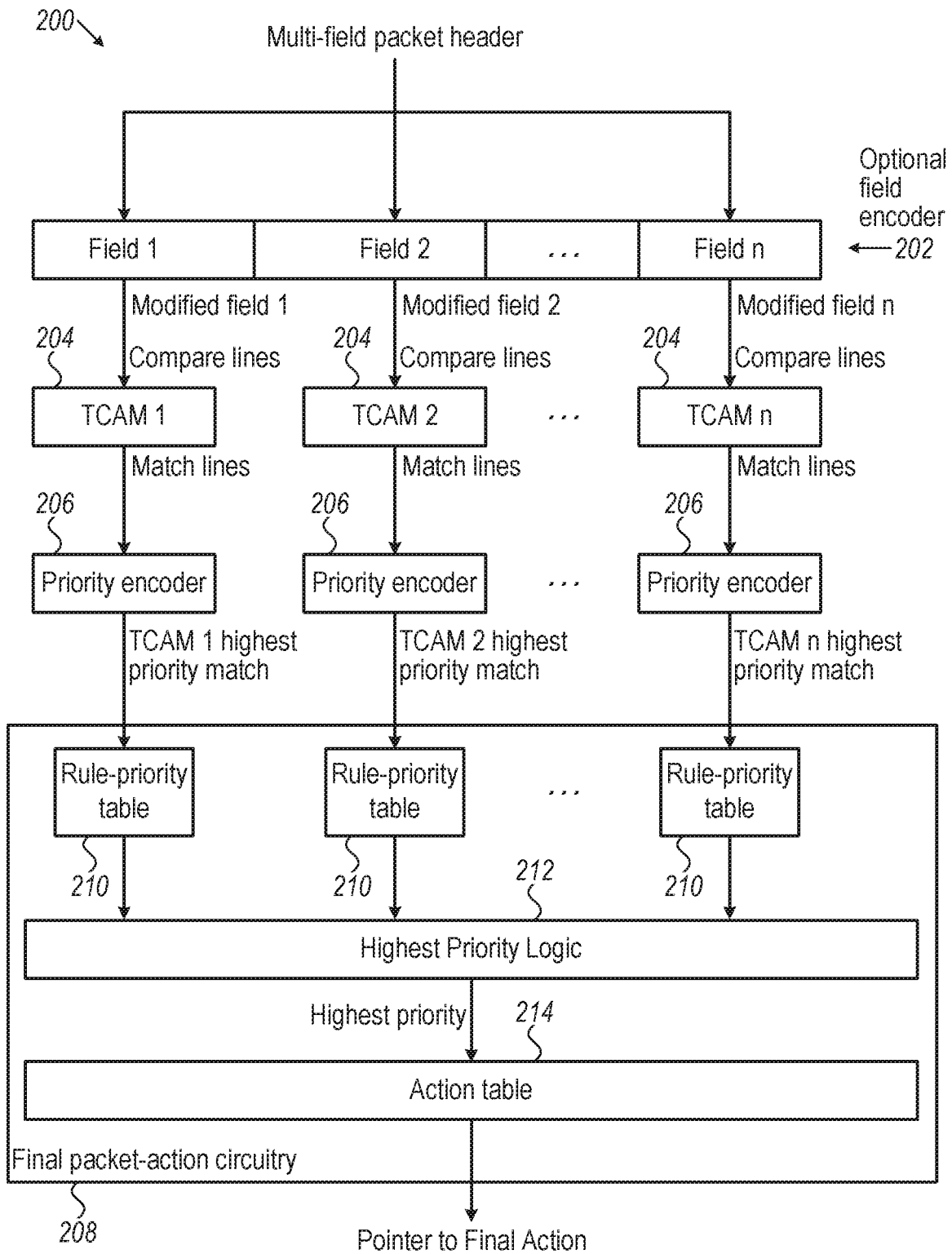
FIG. 2 is a block diagram that schematically illustrates a multi-region TCAM-based Classifier, in accordance with an embodiment of the present invention.

FIG. 2 is a block diagram that schematically illustrates a M-TCAM-Classifier 200 (which can be used to implement classifier 112 in FIG. 1), in accordance with an embodiment of the present invention. The classifier comprises a field encoder 202, multiple TCAMs 204, priority encoders 206, and a Final Packet-Action Circuitry (FPAC) 208.

The classifier receives packet headers (from Parser 110, FIG. 1) that comprise multiple fields (for example, the five fields of a 5-tuple). Field Encoder 202 modifies the packet header fields, generating a representation of the field that may be more suitable for TCAM-based mapping optimization. The operation of field encoder 202 is beyond the scope of the present invention, and, in some embodiments, a field encoder is not used (and, hence, the modified fields in FIG. 2 are identical to the corresponding fields of the packet header).

The modified packet header fields generated by field encoder 202 are input to the compare lines of multiple TCAMs 204. In the example embodiment of FIG. 2, each TCAM 204 receives a single modified field; in alternative embodiments, some of the fields may be concatenated and input to a single TCAM, and in other embodiments, a single modified field may be input to more than one TCAM. In some embodiments the routing of the modified fields to TCAMs may change dynamically.

The match-line outputs of TCAMs 204 are input to priority encoders 206. Each priority encoder outputs a highest priority match binary code, which represents the highest priority match line from the set match lines at its input. If no match line is set, the priority encoder indicates it by an unused code. The following table is an example of a priority encoder with seven inputs, marked A through G.

The output of the priority encoder comprises three bits, and the binary code 000 represents the case where no compare line is set. The priorities of the compare lines are from left (highest) to right:

| A | B | C | D | E | F | G | output |
|---|---|---|---|---|---|---|--------|
| 1 | x | x | x | x | X | x | 111 |
| 0 | 1 | x | x | x | X | x | 110 |
| 0 | 0 | 1 | x | x | X | x | 101 |
| 0 | 0 | 0 | 1 | x | X | x | 100 |
| 0 | 0 | 0 | 0 | 1 | X | x | 011 |
| 0 | 0 | 0 | 0 | 0 | 1 | x | 010 |
| 0 | 0 | 0 | 0 | 0 | 0 | 1 | 001 |
| 0 | 0 | 0 | 0 | 0 | 0 | 0 | 000 |

The outputs of priority encoders 206 are input to FPAC 208, which comprises Rule Priority Tables 210, a Highest Priority Logic 212, and an Action Table 214. The Rule-Priority-Tables comprises a map that, for every binary code in its highest-priority-match input, generates a priority number which corresponds to the input priority and the input TCAM. For example, if there are 100 match lines in all TCAMs combined, each rule-priority table may assign a number from 1 to 100 to each highest priority match input, according to the rule priority.

The rule-priority numbers from rule-priority tables 210 are input to the Highest Priority Logic 212, which selects the highest priority input (for example, by detecting the input with the highest value), and outputs a code representing the highest priority match from all TCAMs.

The code representing the highest priority is the input to action table 214, which maps the priority code to a packet action, to be performed by Control Logic 114 (FIG. 1).

Thus, according to the example embodiments illustrated in FIG. 2 and described above, packets are classified by a plurality of TCAMs, wherein the input to each TCAM is a field (or a modified field) of the packet header. Since the number of compare lines in each TCAM corresponds to a single field of the packet header, the sum of all TCAM areas and power dissipation may be considerably smaller than the case wherein a single TCAM receives the full width of the packet header.

As would be appreciated, the structure of M-TCAM-classifier 200 described above is cited by way of example. Classifiers in accordance to the disclosed techniques are not limited to the description hereinabove. In alternative embodiments, for example field encoder 202 may not be used. In some embodiments, TCAM search is done serially, and hence a single priority encoder may be shared. In embodiments, Rule priority tables 210 may be embedded in priority encoders 206.

In some other embodiments priority encoder 206 is embedded in TCAM 204; in an embodiment, some of the TCAMs are implemented on-chip, and some off-chip.

Serial, Parallel and Pipelined TCAM Search

TCAM comparisons in the M-TCAM-classifier may be done in parallel, in series, or in a combination of serial and parallel comparisons. In embodiments according to the present invention, where all the TCAMs compare the packet header at the same time, the time to get the rule will be constant, as set according by the delay of the slowest TCAM.

In embodiments wherein the TCAM are accessed serially, the worst-case time to get the rule will be the sum of the delays of all TCAMs. However, some embodiments of the present invention implement "pruning"—the TCAMs are arranged so that the higher priority rules will be compared first, and the search may be terminated when a match is found. In embodiments that implement pruning and serial TCAM search, therefore, the average search time may be reduced.

Figure 3:
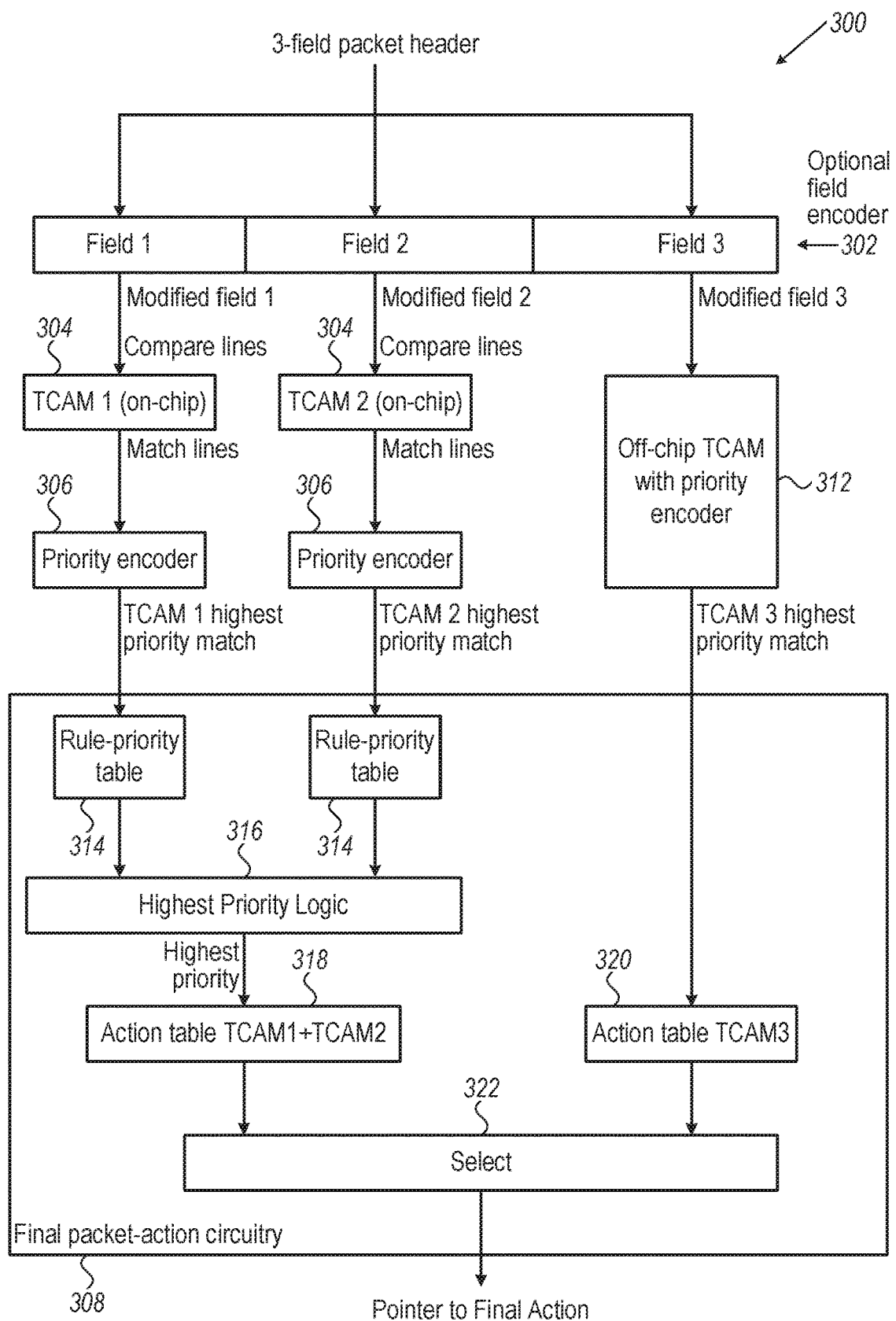
FIG. 3 is a block diagram that schematically illustrates a mixed serial-parallel multi-region TCAM-based Classifier, in accordance with an embodiment of the present invention.

FIG. 3 is a block diagram 300 that schematically illustrates a mixed serial-parallel M-TCAM-classifier 300, in accordance with an embodiment of the present invention. Classifier 300 can also be used for implementing classifier 112 of FIG. 1. According to the example embodiment of FIG. 3, a large number of low-priority rules are stored in a separate TCAM integrated circuit, whereas a smaller amount of higher priority rules is stored in on-chip TCAMs.

The packet header comprises three fields—field 1 and field 2, which access internal TCAMs, and field 3, which accesses the off-chip TCAM.

M-TCAM-classifier 300 comprises optional field encoders 302, on-chip TCAMs 304, priority encoders 306 and an FPAC 308. Like the case described with reference to FIG. 2, optional field-encoder 302 may map the header fields to a representations that allows TCAM optimization; TCAM 1 and TCAM 2 search for matches to fields 1 and 2, respectively, and priority encoders 306 find the highest priority matches of each of the two TCAMs.

When a packet is input to the classifier, the classifier first looks for a match in the higher priority on-chip TCAM 1 and TCAM 2. If none of the two on-chip TCAMs finds a match, the classifier accesses a slower off-chip TCAM 3 (312). According to the example embodiment of FIG. 3, off-chip TCAM 3 comprises a priority encoder, and outputs the code of the matched rule.

FPAC 308 comprises rule-priority tables 314, a Highest Priority Logic 316, and an action table 318 for the rules stored in TCAM1 and TCAM2. Units 314, 316 and 318 are similar to the corresponding units 214, 216 and 218 of FIG. 2.

FPAC 322 further comprises an action table 320 for TCAM3, and a selector 322. If a match is found in either TCAM1 or TCAM2, the selector selects the output of action table 318; if no match is found in either TCAM1 or TCAM2, the selector waits for off-chip TCAM3, and then selects the output of action table 320. The selection of Selector 322 is a pointer to the final packet action.

As would be appreciated, the structure of M-TCAM-classifier 300 described above is cited by way of example. Classifiers in accordance to the disclosed techniques are not limited to the description hereinabove. In alternative embodiments, for example, the number of packet header fields may be different than 3; more off-chip TCAMs may be utilized; TCAM3 may be accessed in parallel to TCAMs 1 and TCAM 2 (but, as it is slower, complete its search at a later time). In other embodiments, the classifier will access TCAM2 only after the classifier receives TCAM1 results, and, thereafter, the classifier will decide whether or not TCAM3 should be accessed.

Figure 4:
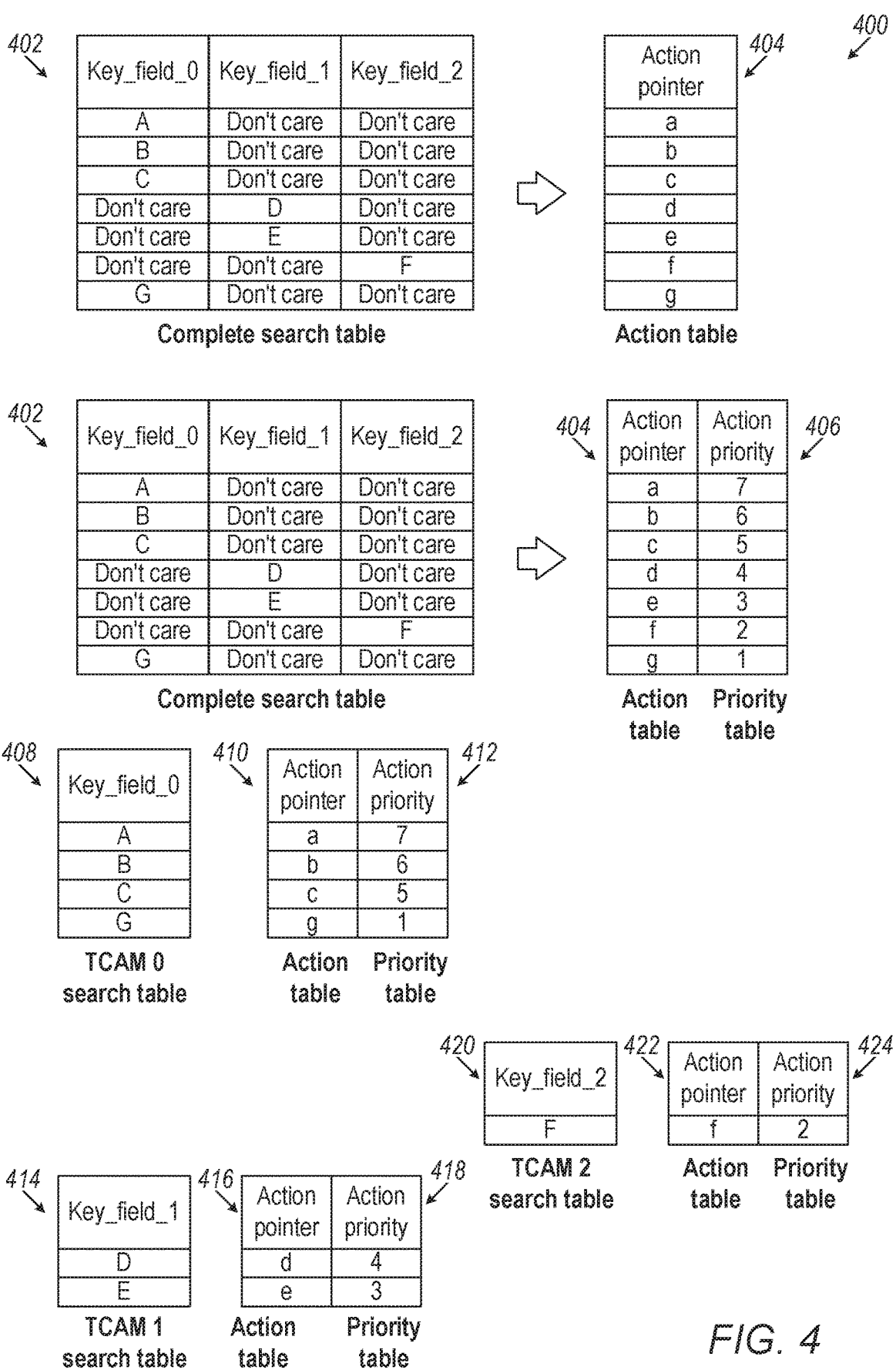
FIG. 4 is a set of tables that schematically illustrates partitioning of a three-field packet-action database to three separate TCAMs, in accordance with an embodiment of the present invention.

FIG. 4 is a set of tables 400 that schematically illustrates partitioning of the three-field packet-action database to three separate TCAMs, in accordance with an embodiment of the present invention. A table 402 describes a complete search database, based on three header fields (Key_field_0, Key_field_1 and Key_field_2). The entries which are closer to the top of the table have higher priority.

Entries of table 402 point to an Action Table 404 that assigns an action code to each of the entries of Table 402. Thus, if some entries in Table 402 match the packet header, the entry which is closest to the top of the table will be flagged (by priority encoder 206, see FIG. 2), and a corresponding action pointer will be indicated by Table 404.

As would be evident, in embodiments wherein table 402 is stored in a single TCAM, the number of compare lines of the TCAM will be the sum of the lengths of the three fields.

To split the rule tables to separate TCAMs, we first define a Priority Table 306 that is attached to the search table. The priorities are arranged from top to bottom.

Next, three different sets of tables are defined, for each of the three packet header fields—a TCAM 0 Search Table 408, that points to an action table 410 and to a priority table 412; a TCAM 1 Search Table 414, that points to an action table 416 and to a priority table 418; and, a TCAM 2 Search Table 420, that points to an action table 422 and to a priority table 424. Tables 408, 410 and 412 comprise all entries of Tables 402, 404 and 406 (respectively) pertaining to Key_Field_0. Similarly, tables 414, 416 and 418 comprise entries pertaining to Key_Field_1; and, tables 420, 422 and 424 comprise entries pertaining to Key_Field_2.

Thus, the single table is split to three tables that may be implemented in three TCAMs. A priority table must be added to each TCAM. As would be evident, the combined size (and power consumption) of the three TCAMS is significantly smaller than that of a single TCAM.

A simplified measure which is roughly proportional to both the size and the power consumption of TCAMS is the number of compare lines multiplied by the number of match line. Assuming each of the three key-fields is 8-bit, the area and power consumption are proportional, according to the example embodiment of FIG. 4, to 24*7=168 for the single TCAM embodiment, and 4*8+2*8+1*8=56 in a three-TCAM embodiment.

As would be appreciated by those skilled in the art, the tables described above with reference to FIG. 4 are conceptual and are not necessarily implemented. For example, global priority table 406, which, in fact, lists the geometrical order of the entries of table 402, is never implemented—it is, instead, distributed in tables 412, 418 and 422.

As would be appreciated, the structure of the tables described above is cited by way of example. Tables in accordance to the disclosed techniques are not limited to the description hereinabove. In alternative embodiments, for example, the number of key-fields may be any number. In some embodiments several key-fields use a single TCAM, and in other embodiments a single key-field may be mapped to more than one TCAM. In yet other embodiments the mapping of field-keys to TCAMs may change during runtime; for example, to optimize the performance when the nature of the network traffic changes.

Run-Time Modifications of Rules

1. Rule Insertion

Packet action rules may change dynamically, for example, rules may be added, removed or modified. In some embodiments, the partition to TCAMs may change dynamically.

In the example embodiments below, we describe run-time modifications of the rules table, according to embodiments of the present invention.

Figure 5:
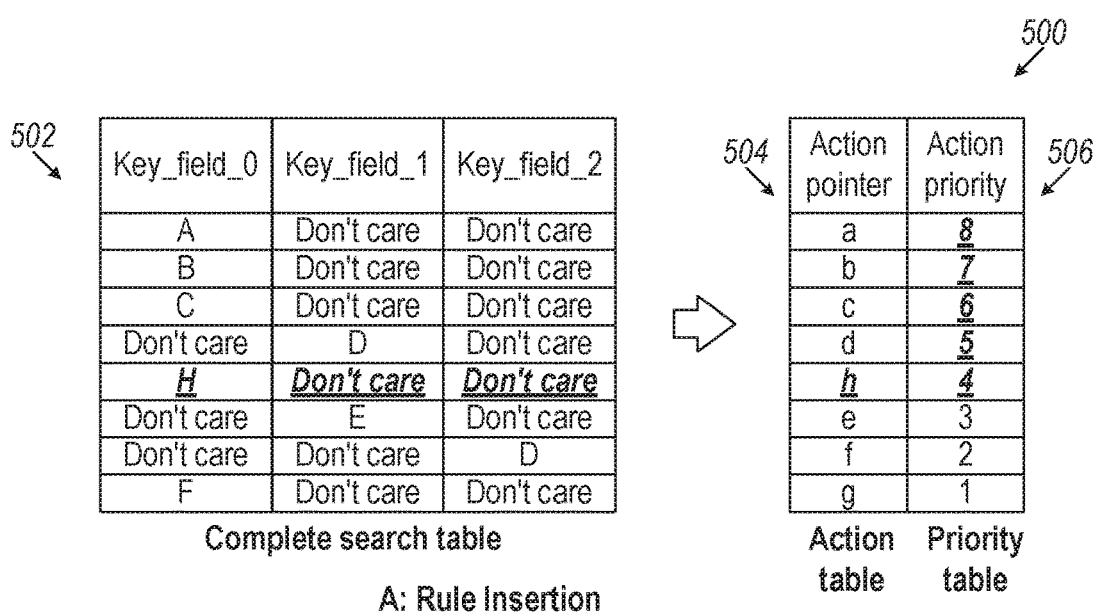
FIG. 5 is a set of tables that schematically illustrate the addition of a new rule, according to embodiments of the present invention.
Figure 5:
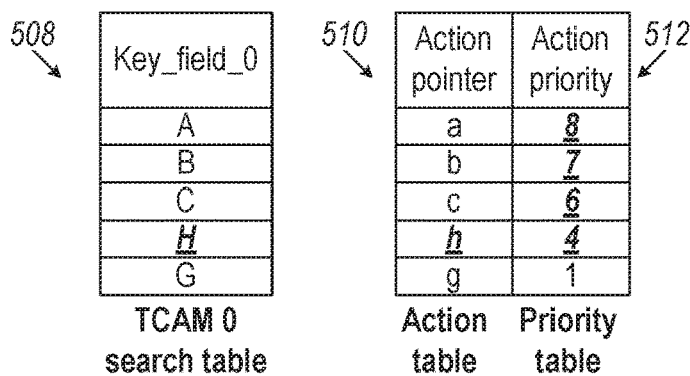
Figure 5:
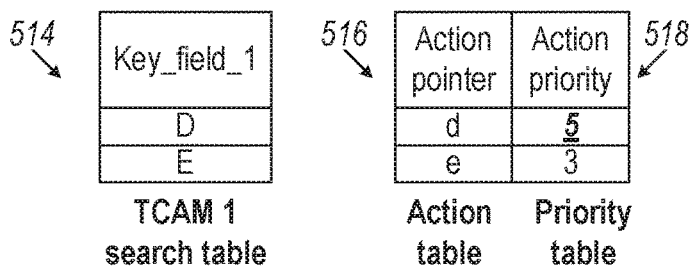
Figure 5:
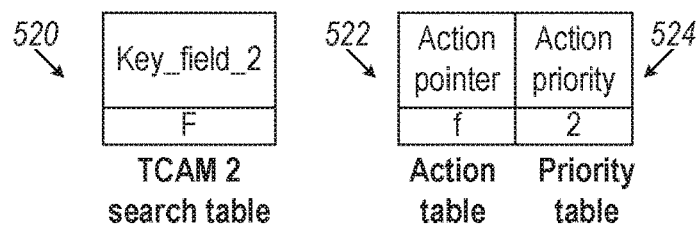

FIG. 5 is a set of tables 500 that schematically illustrate the addition of a new rule, according to embodiments of the present invention. To add a rule, the rules with lower priority are moved down, to make room for the new rule, and the priorities above the new rule are incremented. In embodiments according to the present invention, some additional steps are needed.

The set of tables comprises a Search Table 502, an Action Table 504 and a Priority table 506, which describe the action rules data base (similarly to tables 402, 404 and 406 of FIG. 4). The set of tables additionally comprises TCAM 0 tables 508, 510 and 512; TCAM 1 tables 514, 516 and 518; and, TCAM 2 tables 520, 522 and 524—similarly to the corresponding tables of FIG. 3.

When a new rule H is added in table 502, with priority between the priorities of D and E, action table 504 is modified, to show the corresponding packet action; and table 506 is modified to show the corresponding priority. As the priority of the new rule is between the priorities of D and E, the priorities of rules d and above are incremented, as shown in table 506.

Since the new rule pertains to key_field_0, the rule is added as an entry in TCAM-0 search table 508, and its corresponding action is added in action table 510. In addition, all priority modifications indicated in table 506 are updated in the corresponding priority tables (512 and 518 in the example embodiment of FIG. 5.

Thus, according to embodiments of the present invention, when a rule table is split to more than one TCAM and a new rule is added, the rule may be inserted in the corresponding TCAM table by moving the rules with lower priority down, and the priority tables of all TCAMs may be updated.

2. Rule Deletion and Rule Modification/Replacement

According to embodiment of the present invention, each entry in each TCAM may comprise a Valid bit, and if the Valid bit is not set, the corresponding match line will not be activated, even if all the compare lines match the stored contents of the match line. In some embodiments, Valid may be one of the compare lines which is always set, and, if the corresponding bit in the TCAM entry is not set, the corresponding match line will never be set. In other embodiments, a valid bit may be integrated in the TCAM array.

According to embodiments of the present invention, the network element removes a rule by invalidating the corresponding TCAM entry.

According to an embodiment, rule modification and rule replacement may be done by deletion of the modified or replaced rule, followed by insertion of a new rule. Alternatively, a new rule may first be inserted, and then the old rule may be removed.

3. Atomic Rule-Set Operations

According to some embodiments of the present invention, processor 110 (FIG. 1) may control FPAC circuitry 208 (FIG. 2) to independently activate or deactivate each of the TCAMS. The FPAC accepts match inputs only from active TCAMs and ignores match inputs from all inactive TCAMs.

In embodiments according to the present invention, atomic addition, removal and replacement of sets of rules are facilitated by activation and deactivation of TCAMs.

Figure 6A:
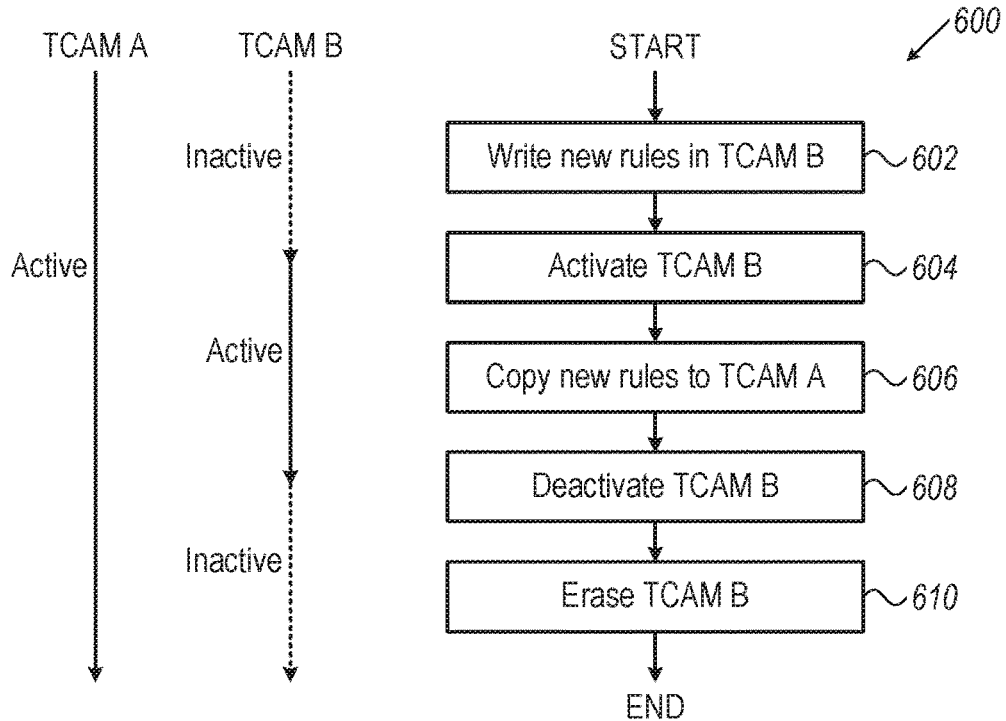
FIG. 6A is a flow chart that schematically describes atomic addition of a new set of rules to a Multi-Region-TCAM-classifier, in accordance with an embodiment of the present invention.

FIG. 6A is a flow chart 600 that schematically describes atomic addition of a new set of rules to a M-TCAM-classifier, in accordance with an embodiment of the present invention. The flow is executed by processor 118 (FIG. 1) (In alternative embodiments, the processor may be any other processor of the network element; in some embodiments the flow-chart may be executed by control logic 114 (FIG. 1), and in other embodiments by a dedicated control).

We assume that prior to the execution of the flow, a TCAM-A is active, and used to classify packets, and a TCAM-B is inactive.

The flow starts at a Writing-New-Rules step 602, wherein the processor writes the new set of rules in TCAM-B. Next, in an Activating TCAM-B step 604, the processor activates TCAM-B, adding the new set of rules to the classifier.

To prepare TCAM-B for other rules insertion (or deletion), the processor next enters a Copying Rules step 606, and copies the new set of rules, one by one, to TCAM-A.

While the processor is in step 606, both TCAMs are active, and two copies of the same rules may co-exist. In embodiments according to the present invention, Highest Priority Logic 212 (FIG. 2) is configured to select only one of several entries that are assigned the same priority; and, thus, the coexistence of the same rules in both TCAM-A and TCAM-B does not affect the functionality and/or the performance of the classifier.

After copying of the new rules is complete, the processor enters a Deactivating TCAM-B step 608 wherein the processor deactivates TCAM-B. Next, the processor enters an Erasing TCAM-B step 610, and erases all entries of TCAM-B. In some embodiments of the present invention all TCAM entries may be erased at once; in other embodiments, erasure is done by serially invalidating all entries.

After step 610, the flow ends.

Figure 6B:
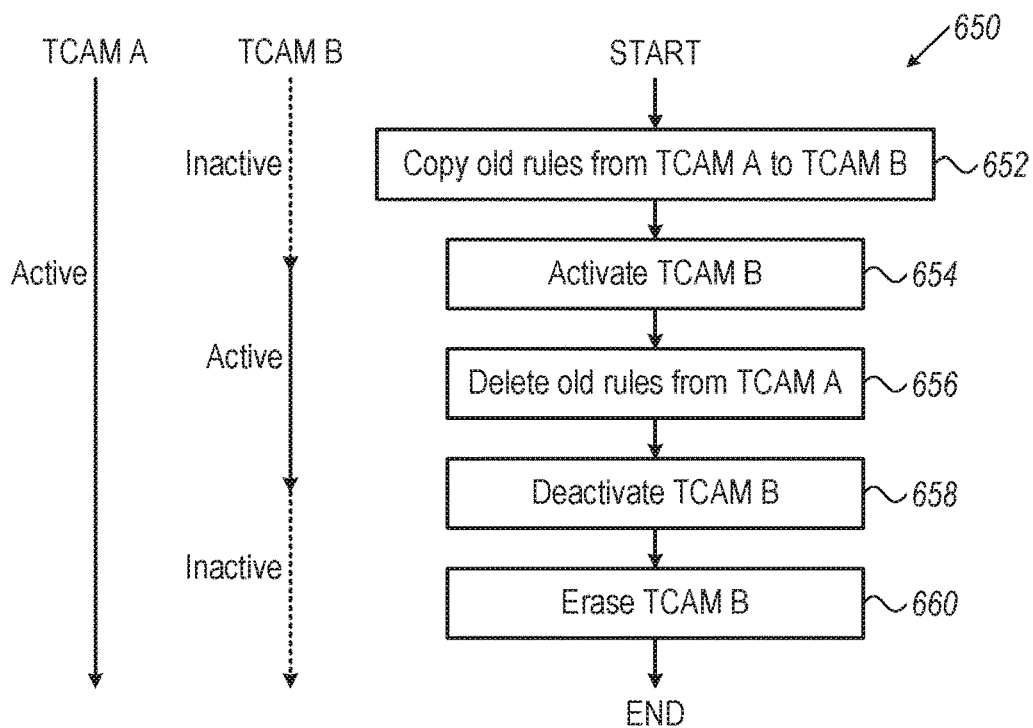
FIG. 6B is a flow chart that schematically describes atomic removal of a set of rules from a Multi-Region-TCAM-classifier, in accordance with an embodiment of the present invention.

FIG. 6B is a flow chart 650 that schematically describes atomic removal of a set of rules from an M-TCAM-classifier, in accordance with an embodiment of the present invention. The flow is executed by processor 118 (FIG. 1) (or by other processors/logic units, as was described in reference to FIG. 6A above).

Prior to the execution of the flow, a TCAM-A is active, and used to classify packets, and a TCAM-B is inactive. The flow starts at a Copying-Rules step 652, wherein the processor copies the set of rules to be removed to the inactive TCAM-B. Next, in an Activating TCAM-B step 654, TCAM-B is activated, and two copies of the rules to be removed are stored in the system (as explain above, this does not adversely affect the functionality and/or performance). Next, in a Deleting Rules step 656, the processor sequentially deletes the set of rules from TCAM-A (e.g., clears the Valid bits). During step 656, since a copy of the set of rules is stored in TCAM-B and since TCAM-B is active, this deletion of rules from TCAM-A will bear no effect.

Next, in a Deactivating TCAM-B step 658, the processor deactivates TCAM-B, and the atomic deletion takes place, as the set of rules is no longer stored in TCAM-A.

To prepare TCAM-B for other rules deletion (or insertion), the processor next enters an Erasing-TCAM-B step 660, wherein the processor deletes the rules from TCAM-B. After step 660 the flow ends.

Figure 6C:
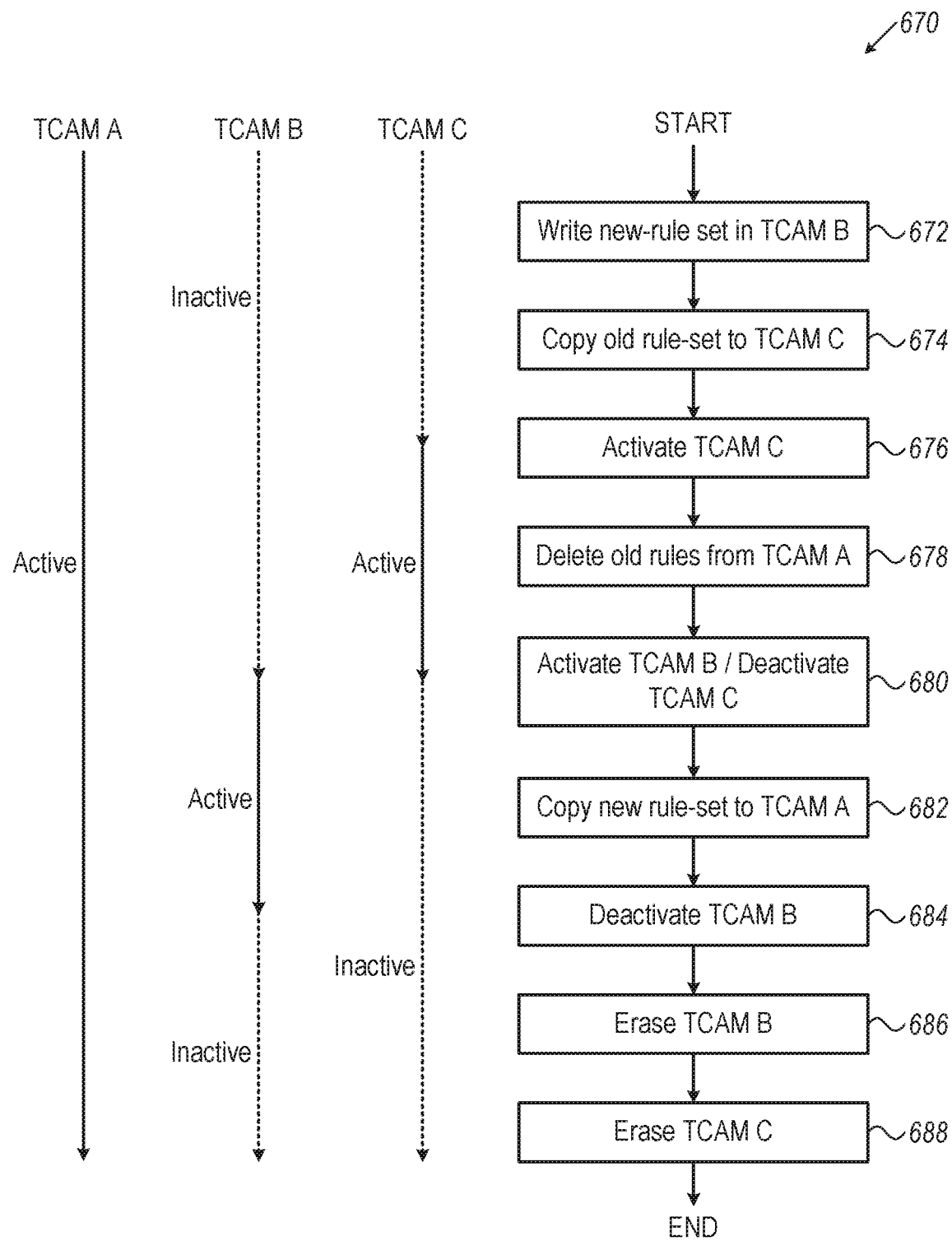
FIG. 6C is a flow chart that schematically describes atomic replacement of an old ruleset by a new ruleset in a Multi-region-TCAM-classifier, in accordance with an embodiment of the present invention.

FIG. 6C is a flow chart 670 that schematically describes atomic replacement of an old ruleset by a new ruleset in an M-TCAM-classifier, in accordance with an embodiment of the present invention. The flow is executed by processor 118 (FIG. 1) (or by other processors/logic units, as was described in reference to FIG. 6A above). Three TCAMs are used, designated TCAM-A TCAM-B and TCAM-C. It is assumed that prior to the execution of the flowchart, TCAM-A is active, whereas TCAM-B and TCAM-C are inactive.

The flow starts at a Writing New Ruleset step 672, wherein the processor writes the new ruleset to TCAM-B. Next, at a Copying Old Ruleset step 674, the processor copies the old ruleset from TCAM-A to TCAM-C.

The processor then enters an Activating TCAM-C step and activates TCAM-C. The old ruleset is now stored in TCAM-A and TCAM-C. Then, in a Deleting Old Rules step 678, the processor sequentially deletes the entries pertaining to the old ruleset from TCAM-A (for example, by resetting the corresponding Valid bits).

In an Activating-TCAM-B-Deactivating-TCAM-C step 680, the processor activates TCAM-B, which stores the new ruleset and, concurrently, deactivates TCAM-C, which stores the old ruleset. This step is, in effect, an atomic replacement of two full rulesets.

In order to prepare for further atomic operations, the processor next enters a Copying New Ruleset step 682 and copies the new ruleset to TCAM-A, a Deactivating TCAM B step 684 wherein the processor deactivated TCAM-C, an Erasing TCAM-B step 686 and an Erasing TCAM-C step 688, wherein the processor erases TCAM-B and TCAM-C. After step 688 the flowchart ends.

As would be appreciated, flows 600, 650 and 670 described above are cited by way of example. Network elements in accordance to the disclosed techniques are not limited to the description hereinabove. In alternative embodiments, for example, the TCAMs are not erased. In some embodiments, more than two TCAMs are used for atomic insertion/deletion, and/or more than three TCAMs are used for atomic ruleset replacement.

The configuration of Network element 100, including M-TCAM Classifier 200 and 300; the structure of FPAC 208 and 308, the methods for rule insertion and removal, and the methods for atomic ruleset insertion, removal and replacement, are example configurations and methods that are shown purely for the sake of conceptual clarity. Any other suitable configurations can be used in alternative embodiments.

In some embodiments, the allocation of packet header bit-fields to TCAMs may be dynamic and change in run-time to improve performance. In an embodiment, the network element further comprises a performance monitoring unit that monitors the performance of the TCAMs and changes the TCAM configuration accordingly.

In embodiments, various methods are employed to optimize the set of rules that are stored in the TCAMs. In an embodiment, an Activity measure is maintained for each TCAM entry, and rules with low activity may be replaced by better rules.

In various embodiments, the various classifier tasks described hereinabove may be carried out by hardware, by software, or by combination of hardware and software.

In various embodiments, the different elements of Network Element 100, including the M-TCAM-classifier and the FPAC, may be implemented using suitable hardware, such as one or more Application-Specific Integrated Circuits (ASIC) or Field-Programmable Gate Arrays (FPGA), or a combination of ASIC and FPGA.

Processor 118 of Network Element 100 typically comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although the embodiments described herein mainly address multi-region TCAM classifiers, the methods and systems described herein can also be used in other applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
   multiple ports, configured to transmit and receive a plurality of packets over a network;
   a hardware fabric, configured to forward said plurality of packets between the ports;
   a packet classifier, which is configured to receive at least some of said plurality of packets and to specify an action to be applied to at least one packet of said plurality of packets in accordance with a set of rules, the classifier comprising:
      multiple Ternary Content Addressable Memories (TCAMs) comprising at least a first TCAM and a second TCAM, each of said first TCAM and said second TCAM storing a respective subset of the set of rules, each of said first TCAM and said second TCAM being configured to match said at least one packet to said respective subset of the set of rules and to output a match result; and
      circuitry, configured to specify the action to be applied to said at least one packet based on (i) match results produced for said at least one packet by the multiple TCAMs and (ii) a priority defined among the multiple TCAMs; and
   control logic, configured to apply the specified action to said at least one packet,
   wherein each of said multiple TCAMs includes a first plurality of compare lines and a second plurality of match lines, and said multiple TCAMs are configured such that a product of said first plurality of compare lines and said second plurality of match lines, summed over all of said multiple TCAMs, is less than a product of compare lines and match lines that would be required to implement said set of rules in a single TCAM.

2. The network element according to claim 1, wherein the circuitry is further configured to reconfigure two or more of the rules atomically, by selectively activating and deactivating one or more of the multiple TCAMs.

3. The network element according to claim 2, wherein the circuitry is configured to deactivate said first TCAM while retaining at least said second TCAM active, to reconfigure the rules in said deactivated first TCAM, and then to activate said first TCAM.

4. The network element according to claim 1, wherein the circuitry is configured to:
   define a subset of the multiple TCAMs as high-priority TCAMs;
   if at least one of the high-priority TCAMs indicates a successful match for the packet, specify the action based only on the match results of the high-priority TCAMs; and
   if none of the high-priority TCAMs indicates a successful match for the packet, wait for the match results of one or more TCAMs other than the high-priority TCAMs for specifying the action.

5. The network element according to claim 4, wherein the high-priority TCAMs have a faster response time than the TCAMs other than the high-priority TCAMs.

6. The network element according to claim 4, wherein the high-priority TCAMs are on-chip TCAMs that are located in a same Integrated Circuit (IC) as the fabric, and the TCAMs other than the high-priority TCAMs are off-chip TCAMs that are not located in the same IC as the fabric.

7. The network element according to claim 1, wherein the circuitry is configured to assign each rule a respective activity indicator, which is indicative of how frequently, from among the rules stored in the plurality of TCAMs, the action was specified based on that rule.

8. A method, comprising:
   in a network element that transmits and receives a plurality of packets over a network, specifying an action to be applied to at least one packet of said plurality of packets in accordance with a set of rules, by:
      in each of multiple Ternary Content Addressable Memories (TCAMs) comprising at least a first TCAM and a second TCAM, each of said first TCAM and said second TCAM storing a respective subset of the set of rules, matching said at least one packet to said respective subset of the set of rules and outputting a match result; and
      specifying the action to be applied to said at least one packet based on (i) match results produced for said at least one packet by the multiple TCAMs and (ii) a priority defined among the multiple TCAMs; and
   applying the specified action to said at least one packet,
   wherein each of said multiple TCAMs includes a first plurality of compare lines and a second plurality of match lines, and said multiple TCAMs are configured such that a product of said first plurality of compare lines and said second plurality of match lines, summed over all of said multiple TCAMs, is less than a product of compare lines and match lines that would be required to implement said set of rules in a single TCAM.

9. The method according to claim 8, further comprising reconfiguring two or more of the rules atomically, by selectively activating and deactivating one or more of the multiple TCAMs.

10. The method according to claim 9, wherein reconfiguring the rules atomically comprises deactivating said first TCAM while retaining at least said second TCAM active, reconfiguring the rules in said deactivated first TCAM, and then activating said first TCAM.

11. The method according to claim 8, wherein specifying the action comprises:
   defining a subset of the multiple TCAMs as high-priority TCAMs;
   if at least one of the high-priority TCAMs indicates a successful match for the packet, specifying the action based only on the match results of the high-priority TCAMs; and
   if none of the high-priority TCAMs indicates a successful match for the packet, waiting for the match results of one or more TCAMs other than the high-priority TCAMs for specifying the action.

12. The method according to claim 11, wherein the high-priority TCAMs have a faster response time than the TCAMs other than the high-priority TCAMs.

13. The method according to claim 11, wherein the high-priority TCAMs are on-chip TCAMs that are located in a same Integrated Circuit (IC) as the fabric, and the TCAMs other than the high-priority TCAMs are off-chip TCAMs that are not located in the same IC as the fabric.

14. The method according to claim 8, further comprising assigning each rule a respective activity indicator, which is indicative of how frequently, from among the rules stored in the plurality of TCAMs, the action was specified based on that rule.

15. The network element according to claim 1 and wherein each respective subset of the set of rules is distinct from each other respective subset of the set of rules.

16. The method according to claim 8 and wherein each respective subset of the set of rules is distinct from each other respective subset of the set of rules.

* * * * *